United States Patent
Lee et al.

(10) Patent No.: US 12,359,969 B2
(45) Date of Patent: Jul. 15, 2025

(54) SPECTRAL CAMERA AND ELECTRONIC DEVICE INCLUDING THE SAME

(71) Applicants: SAMSUNG ELECTRONICS CO., LTD., Suwon-si (KR); Korea University Research and Business Foundation, Seoul (KR)

(72) Inventors: Suyeon Lee, Suwon-si (KR); Q-Han Park, Seoul (KR); Unjeong Kim, Suwon-si (KR); Hojung Kim, Suwon-si (KR); Hyunjun Ma, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 238 days.

(21) Appl. No.: 18/120,781

(22) Filed: Mar. 13, 2023

(65) Prior Publication Data
US 2024/0094053 A1    Mar. 21, 2024

(30) Foreign Application Priority Data
Sep. 15, 2022  (KR) .......................... 10-2022-0116669

(51) Int. Cl.
G01J 3/28     (2006.01)
G01J 3/02     (2006.01)

(52) U.S. Cl.
CPC ........... *G01J 3/2823* (2013.01); *G01J 3/0202* (2013.01); *G01J 3/0278* (2013.01); *G01J 3/0294* (2013.01);
(Continued)

(58) Field of Classification Search
CPC ....... G01J 2003/2806; G01J 2003/2826; G01J 3/0202; G01J 3/0208; G01J 3/0237;
(Continued)

(56) References Cited

U.S. PATENT DOCUMENTS 7,460,160 B2   12/2008   Hershey et al.
8,577,216 B2   11/2013   Li et al.
(Continued)

FOREIGN PATENT DOCUMENTS

CN   110332991 B    7/2021
EP   1 103 828 A2   5/2001
(Continued)

OTHER PUBLICATIONS

Communication dated Jan. 29, 2024 issued by the European Patent Office in European Application No. 23174252.9.
(Continued)

*Primary Examiner* — Hina F Ayub
(74) *Attorney, Agent, or Firm* — Sughrue Mion, PLLC

(57) ABSTRACT

Provided are a spectral camera and an electronic apparatus including the same. The spectral camera includes an image sensor including a plurality of channels configured to detect a plurality of central wavelengths; an optical module configured to be movable with respect to the image sensor to provide an image of an object on the image sensor; a memory configured to store first information about a change in an optical characteristic of each of the plurality of channels in the image sensor, the change in the optical characteristic of each of the plurality of channels corresponding to a movement of the optical module; and a processor configured to: obtain the first information from the memory, obtain second information corresponding to the plurality of central wavelengths detected by the image sensor, and obtain third information by correcting the second information based on the first information.

20 Claims, 9 Drawing Sheets

(52) U.S. Cl.
CPC ..... *G01J 3/0256* (2013.01); *G01J 2003/2826* (2013.01)

(58) Field of Classification Search
CPC ...... G01J 3/0256; G01J 3/0278; G01J 3/0294; G01J 3/2803; G01J 3/2823
See application file for complete search history.

(56) References Cited

U.S. PATENT DOCUMENTS

| | | | |
|---|---|---|---|
| 9,213,913 | B1 | 12/2015 | Robinson et al. |
| 9,294,663 | B2 | 3/2016 | Arai |
| 9,325,966 | B2 | 4/2016 | Tin |
| 9,491,331 | B2 | 11/2016 | Kaneko et al. |
| 9,766,382 | B2 | 9/2017 | Darty |
| 9,854,221 | B2 | 12/2017 | Li et al. |
| 9,857,222 | B2 | 1/2018 | Geelen et al. |
| 9,960,198 | B2 | 5/2018 | Yokogawa |
| 10,080,528 | B2 | 9/2018 | Debusschere et al. |
| 10,534,116 | B2 | 1/2020 | Darty |
| 10,545,050 | B2 | 1/2020 | Yoon et al. |
| 10,918,320 | B2 | 2/2021 | Jos et al. |
| 10,928,248 | B2 | 2/2021 | Kim et al. |
| 11,134,848 | B2 | 10/2021 | Bala et al. |
| 11,156,752 | B2 | 10/2021 | Hwang et al. |
| 2019/0013734 | A1 | 1/2019 | Nakashima et al. |
| 2019/0016091 | A1 | 1/2019 | Lee et al. |
| 2019/0079004 | A1 | 3/2019 | Ulanch et al. |
| 2019/0111338 | A1 | 4/2019 | Nakata et al. |
| 2020/0116567 | A1 | 4/2020 | Yoon et al. |
| 2020/0333187 | A1 | 10/2020 | Moggridge et al. |
| 2021/0152681 | A1 | 5/2021 | Yoon et al. |
| 2021/0176412 | A1 | 6/2021 | Yoon et al. |
| 2022/0003906 | A1 | 1/2022 | Kim et al. |
| 2022/0128407 | A1 | 4/2022 | Lee et al. |
| 2022/0326078 | A1 | 10/2022 | Yu et al. |
| 2022/0364917 | A1* | 11/2022 | Houck ................. G01J 3/0237 |

FOREIGN PATENT DOCUMENTS

| | | |
|---|---|---|
| EP | 2 858 342 A1 | 4/2015 |
| JP | 11-248534 A | 9/1999 |
| JP | 2020-64162 A | 4/2020 |
| KR | 10-2013-0084718 A | 7/2013 |
| KR | 10-2014-0101184 A | 8/2014 |
| KR | 10-2020-0040552 A | 4/2020 |
| KR | 10-2022-0070296 A | 5/2022 |
| WO | 2018/085841 A1 | 5/2018 |
| WO | 2021/173763 A1 | 9/2021 |
| WO | 2023/116444 A1 | 6/2023 |

OTHER PUBLICATIONS

Office Action issued Jul. 10, 2024 by the Korean Patent Office for KR Patent Application No. 10-2022-0116669.

* cited by examiner

5100m

5200

5300

5400

5500

[Security]

SPECTRAL CAMERA AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2022-0116669, filed on Sep. 15, 2022, in the Korean Intellectual Property Office, the disclosure of which is incorporated by reference herein in its entirety.

BACKGROUND

1. Field

The present disclosure relates to a spectral camera and an electronic device including the spectral camera.

2. Description of the Related Art

A spectrometer is an important optical device in the field of optics. However, related art spectrometers are bulky and heavy. Recently, there has been a demand to reduce the size of a spectrometer, and accordingly, research on simultaneous implementation of an integrated circuit and an optical device on one semiconductor chip has been conducted.

An image sensor may be manufactured by providing a spectral filter including unit filters having different central wavelengths on a pixel array. In addition, an optical module focusing an image of a target object on the image sensor is arranged on the image sensor, and then, the spectral camera may be implemented.

SUMMARY

One or more embodiments provide a spectral camera and an electronic device including the same.

Additional aspects will be set forth in part in the description which follows and, in part, will be apparent from the description, or may be learned by practice of the presented embodiments of the disclosure.

According to an aspect of an example embodiment, a spectral camera includes: an image sensor including a plurality of channels configured to detect a plurality of central wavelengths; an optical module configured to be movable with respect to the image sensor to provide an image of an object on the image sensor; a memory configured to store first information about a change in an optical characteristic of each of the plurality of channels in the image sensor, the change in the optical characteristic of each of the plurality of channels corresponding to a movement of the optical module; and a processor configured to: obtain the first information from the memory, obtain second information corresponding to the plurality of central wavelengths detected by the image sensor, and obtain third information by correcting the second information based on the first information.

The change in the optical characteristic of each of the plurality of channels in the image sensor may be generated based on a change of a chief ray angle (CRA) of light incident on each channel of the image sensor.

The spectral camera may further include a driver configured to move the optical module with respect to the image sensor.

The processor may be further configured to control the driver.

The plurality of channels may include at least three channels detecting central wavelengths different from one another.

The spectral camera may further include a hyperspectral camera or a multispectral camera.

The image sensor may further include: a spectral filter including a plurality of unit filters having different central wavelengths; and a pixel array including a plurality of pixels on which light that has passed through the plurality of unit filters is incident.

The memory may be further configured to store the first information in a form of a profile obtained through a fitting process for data about the change in the optical characteristic of each of the plurality of channels in the image sensor.

The processor may be further configured to restore an input spectrum of light incident on the image sensor through reconstruction of the third information.

The processor may be further configured to restore the image of the object by using the input spectrum.

According to an aspect of an example embodiment, an electronic apparatus includes the spectral camera.

According to an aspect of an example embodiment, an operating method of a spectral camera, includes: imaging an object onto an image sensor of the spectral camera by moving an optical module of spectral camera, the image sensor including a plurality of channels configured to detect a plurality of central wavelengths; obtaining, from a memory of the spectral camera, first information about a change in an optical characteristic of at least one the plurality of channels in the image sensor, the change in the optical characteristic of the at least one of the plurality of channels corresponding to a movement of the optical module; obtaining second information corresponding to the plurality of central wavelengths detected by the image sensor, and obtaining third information by correcting the second information based on the first information.

The method may further include moving the optical module by a driver of the spectral camera controlled by a processor of the spectral camera.

The plurality of channels may include at least three channels detecting different central wavelengths.

The method may further include storing the first information in a form of a profile obtained through a fitting process for data about the change in the optical characteristic of each of the plurality of channels in the image sensor.

The method may further include restoring an input spectrum of light incident on the image sensor through reconstruction of the third information.

The method may further include restoring the image of the object by using the input spectrum.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
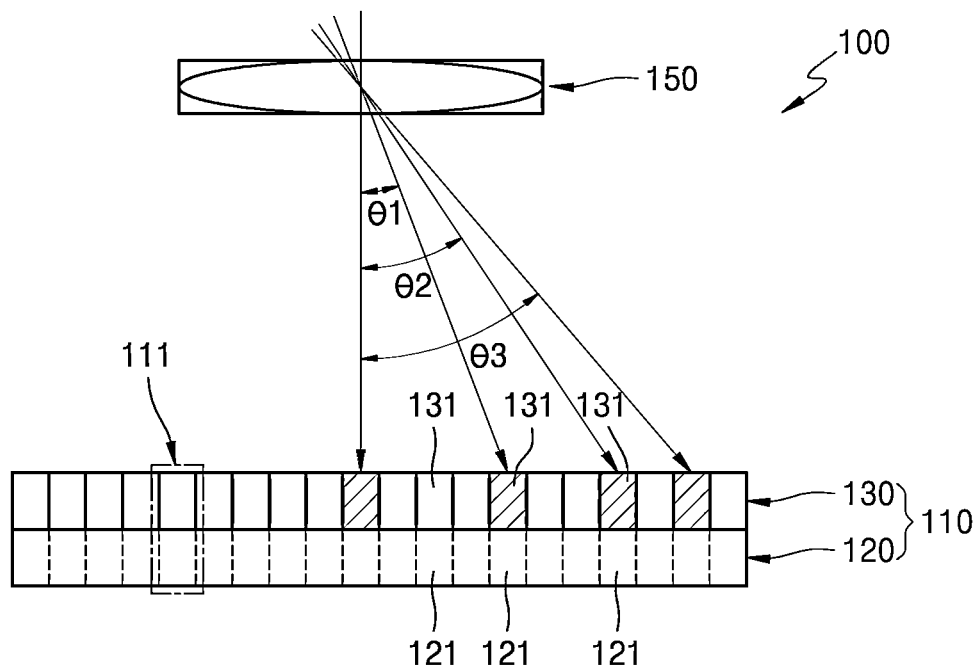
FIG. 1 is a schematic diagram of a spectral camera according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of the disclosure will be described in detail with reference to accompanying drawings. In the drawings, like reference numerals denote like components, and sizes of components in the drawings may be exaggerated for convenience of explanation. The embodiments of the disclosure are capable of various modifications and may be embodied in many different forms.

When a layer, a film, a region, or a panel is referred to as being "on" another element, it may be directly on/under/at left/right sides of the other layer or substrate, or intervening layers may also be present. An expression used in the singular encompasses the expression of the plural, unless it has a clearly different meaning in the context. It will be further understood that when a portion is referred to as "comprises" another component, the portion may not exclude another component but may further comprise another component unless the context states otherwise.

The use of the terms of "the above-described" and similar indicative terms may correspond to both the singular forms and the plural forms. Also, the steps of all methods described herein may be performed in any suitable order unless otherwise indicated herein or otherwise clearly contradicted by context.

Also, the terms " . . . unit", " . . . module" used herein specify a unit for processing at least one function or operation, and this may be implemented with hardware or software or a combination of hardware and software.

Furthermore, the connecting lines or connectors shown in the drawings are intended to represent example functional relationships and/or physical or logical couplings between the various elements. It should be noted that many alternative or additional functional relationships, physical connections, or logical connections may be present in a practical device.

The use of any and all examples, or example language provided herein, is intended merely to better illuminate the disclosure and does not pose a limitation on the scope of the disclosure unless otherwise claimed.

Figure 2:
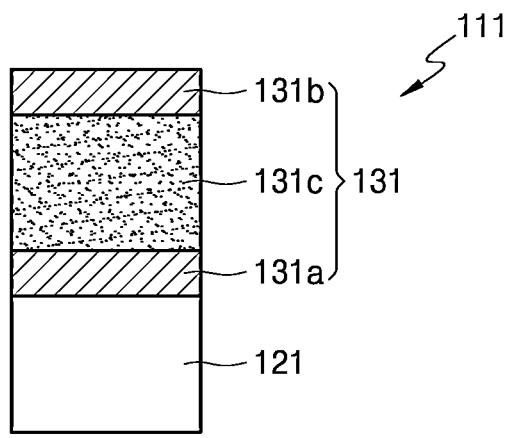
FIG. 2 is a cross-sectional view showing an example of a cross-section of each channel in the image sensor of FIG. 1.

FIG. 1 is a schematic diagram of a spectral camera 100 according to an example embodiment. FIG. 2 is a cross-sectional view showing an example cross-section of each channel 111 in an image sensor 110 of FIG. 1.

Referring to FIG. 1 and FIG. 2, the spectral camera 100 includes the image sensor 110 and an optical module 150 provided on the image sensor 110. The image sensor 110 may include a plurality of channels 111 that are configured to detect central wavelengths, which are different from one another. For example, the image sensor 110 may include three or more channels 111 detecting different central wavelengths from one another. The image sensor 110 may include, for example, a charge coupled device (CCD) image sensor or a complementary metal oxide semiconductor (CMOS) image sensor, but is not limited thereto.

The image sensor 110 may include a spectral filter 130 and a pixel array 120 provided on a lower surface of the spectral filter 130. The image sensor 110 may further include a timing controller, a row decoder, an output circuit, etc.

The spectral filter 130 transmits light of different wavelength bands, and includes a plurality of unit filters 131 arranged two-dimensionally. The pixel array 120 includes a plurality of pixels 121 that sense light of different wavelengths after passing through the plurality of unit filters 131. The pixel array 120 includes the pixels 121 that are two-dimensionally arranged along a plurality of rows and columns. The row decoder selects one of the rows in the pixel array 120 in response to a row address signal output from the timing controller. The output circuit outputs a photosensitive signal, in a column unit, from a plurality of pixels arranged in the selected row. To this end, the output circuit may include a column decoder and an analog-to-digital converter (ADC). For example, the output circuit may include a plurality of ADCs that are arranged respectively to columns between the column decoder and the pixel array 120, or one ADC arranged at an output end of the column decoder. The timing controller, the row decoder, and the output circuit may be implemented as one single chip or separate chips.

The spectral filter 130 includes a plurality of unit filters 131 having different central wavelengths, and the pixel array 120 may include a plurality of pixels 121 provided to correspond to the plurality of unit filters 131. Each of the unit filters 131 in the spectral filter 130 and each of the pixels 121 of the pixel array 120 form each channel 111 of the image sensor 110.

FIG. 2 shows an example of a cross-section of each channel 111 in the image sensor 110. Each channel 111 of the image sensor 110 includes the unit filter 131 and the pixel 121 provided under the unit filter 131. Each unit filter 131 of the spectral filter 130 may have a resonator structure that only transmits light of a certain wavelength. For example, each unit filter 131 may include a lower reflective layer 131a and an upper reflective layer 131b that are spaced apart from each other, and a cavity 131c provided between the lower and upper reflective layers 131a and 131b.

Each of the lower and upper reflective layers 131a and 131b may be a metal reflective layer including, for example, Al, Ag, Au, Cu, W, Ti, or TiN. In addition, for example, each of the lower and upper reflective layers 131a and 131b may be a Bragg reflector in which two or more dielectric layers having different refractive indices from each other are alternately stacked.

The cavity 131c may include one or more dielectrics having a certain refractive index. The cavity 131c may include, for example, at least one selected from silicon, silicon oxide, silicon nitride, and titanium oxide, but is not limited thereto. Each unit filter 131 of the spectral filter 130 may adjust the central wavelength by changing a thickness and/or an effective refractive index of the cavity 131c. Accordingly, the unit filters 131 of the spectral filter 130 may be manufactured to have different central wavelengths.

The optical module 150 is provided on the image sensor 110. The optical module 150 may collect light emitted from an object that is a target to be photographed and image the object on the image sensor 110. The optical module 150 may include one or more lenses.

Referring to FIG. 1, while the light emitted from the object is incident on the image sensor 110 via the optical module 150, the incident light may be incident, to be inclined, on the channels 111 that are located out of the center of the image sensor 110. A chief ray angle (CRA) of the light incident on the channel 111 located at the center of the image sensor 110 may be 0°, and the CRA of the light incident on the channels 111 away from the center of the image sensor 110 may be greater than 0°. FIG. 1 shows an example in which the CRAs of the light incident on certain channels 111 away from the center of the image sensor 110 are respectively θ1, θ2(>θ1), and θ3 (>θ2).

As described above, the CRA of the incident light incident on each channel 111 of the image sensor 110 increases away from the center of the image sensor 110, and according to the increase in the CRA, optical characteristics (e.g., optical characteristic of each unit filter 131) of each channel 111 may be changed as described later. For example, the central wavelength of each unit filter 131 may be shifted or an intensity of light transmitting through each unit filter 131 may be changed away from the center of the image sensor 110.

Figure 3:
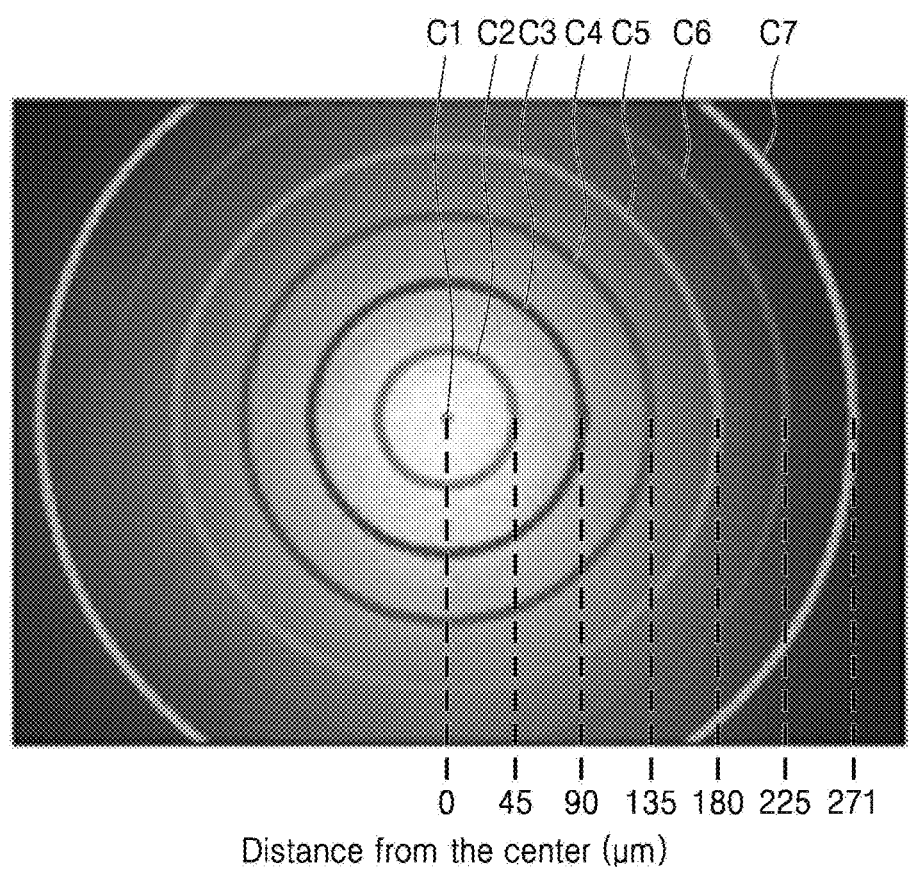
FIG. 3 is a diagram showing an example of an image capturing light output from an image sensor.

FIG. 3 is a diagram showing an example of an output from an image sensor. Here, the image sensor is manufactured to include a plurality of channels detecting the same central wavelength for convenience of description. Each channel of the image sensor has the structure as shown in FIG. 2, and is manufactured to have a size about 1 μm×1 μm.

FIG. 3 shows a center C1 of the image sensor and six concentric circles C2 to C7 that are gradually away from the center C1. A radius of each of the concentric circles C2 to C7 may be a distance from the center of the image sensor. At the center C1 of the image sensor, a channel having the CRA of 0° is arranged, and channels having gradually increased CRAs are arranged on the concentric circles C2 to C7 that are gradually away from the center. The channels having the same CRA are arranged on each of the concentric circles C2 to C7. Referring to FIG. 3, as the channels are arranged at the positions away from the center C1 of the image sensor, the intensity of detected light is gradually decreased.

Figure 4:
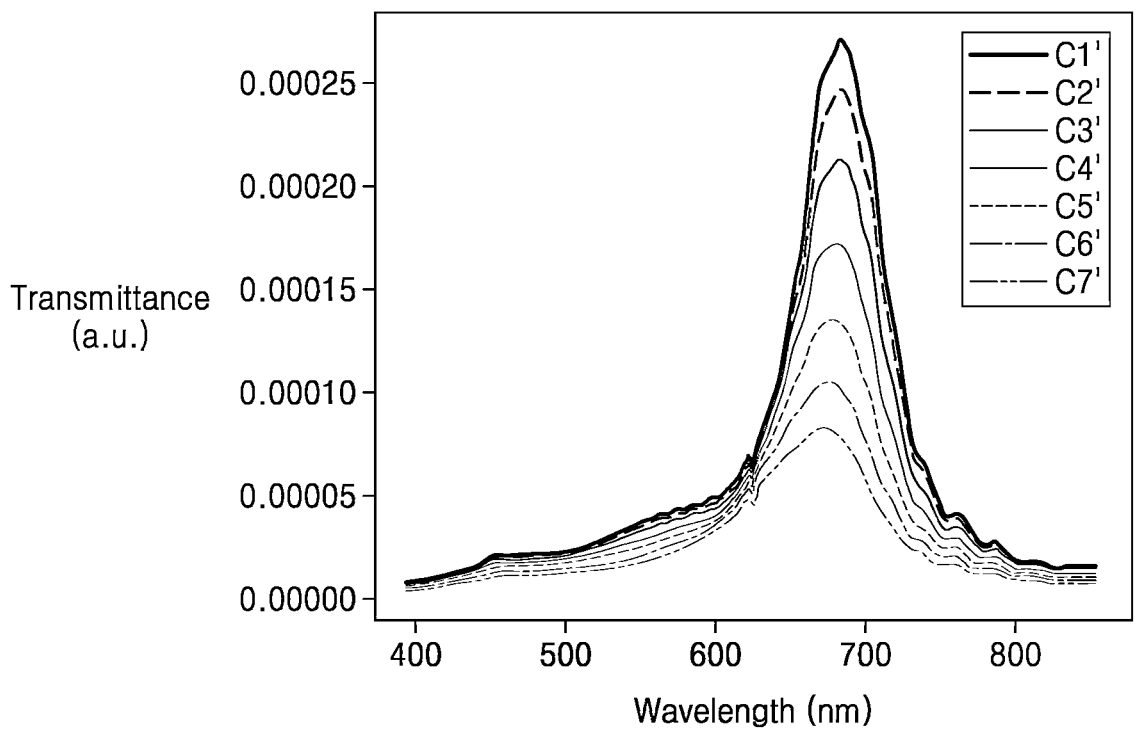
FIG. 4 is a diagram showing transmission spectrums measured from channels arranged at a center of the image sensor of FIG. 3 and each concentric circle.

FIG. 4 shows transmission spectrums measured from the channels arranged on the center C1 of the image sensor and each of the concentric circles C2 to C7 shown in FIG. 3. In FIG. 4, a spectrum C1' denotes the transmission spectrum of the channel arranged on the center C1 of the image sensor shown in FIG. 3. In addition, transmission spectrums C2' to C7' denote transmission spectrums of the channels arranged on the concentric circles C2 to C7 of the image sensor shown in FIG. 3.

Referring to FIG. 4, as the channels are arranged away from the center of the image sensor, different transmission spectrums are obtained from the channels. That is, when the CRA of the light incident on each channel is changed, the optical characteristic of each channel may be different. According to an example embodiment, the optical characteristic of each channel may include, but is not limited to, the central wavelength, light intensity, a full width at half maximum (FWHM).

Figure 5A:
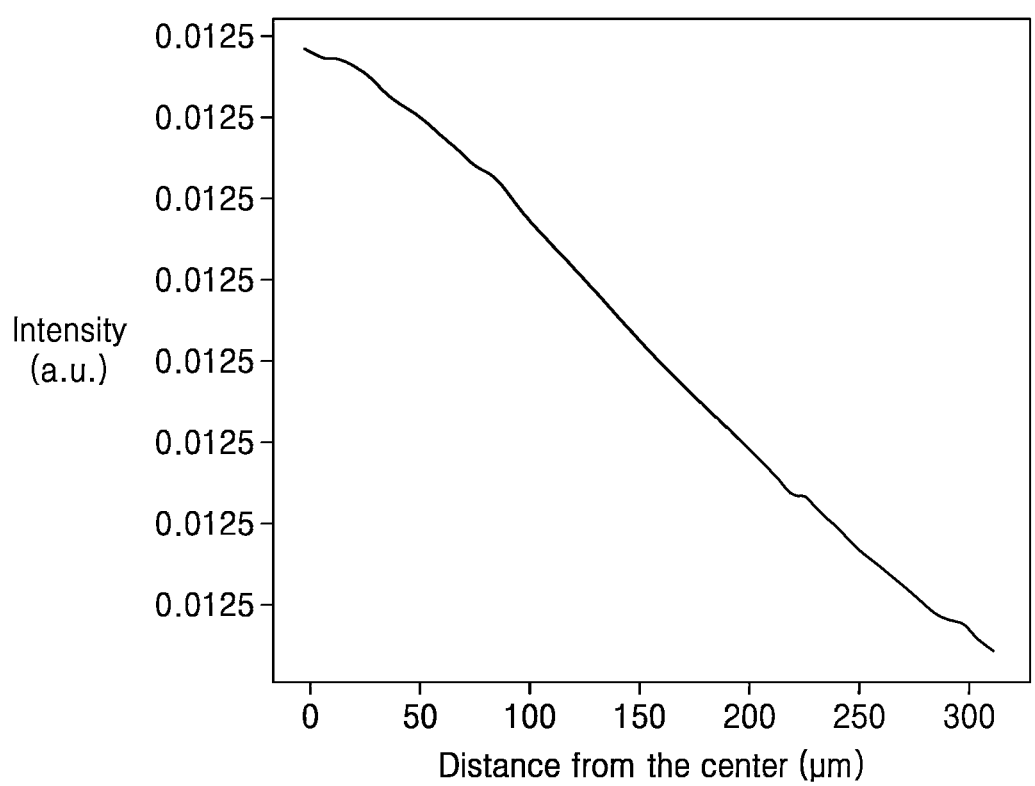
FIG. 5A is a diagram showing a change in light intensity when the channel is away from the center of the image sensor in the transmission spectrum of FIG. 4.

FIG. 5A is a diagram showing a change in light intensity when the channel is away from the center of the image sensor in the transmission spectrum of FIG. 4. Referring to FIG. 5A, as the channels are away from the center of the image sensor, the intensity of light detected by the channels is gradually weakened. For example, the intensity of light detected a first channel closer to the center of the image sensor may have be greater than the intensity of light detected a second channel further away from the center of the image sensor than the first channel.

Figure 5B:
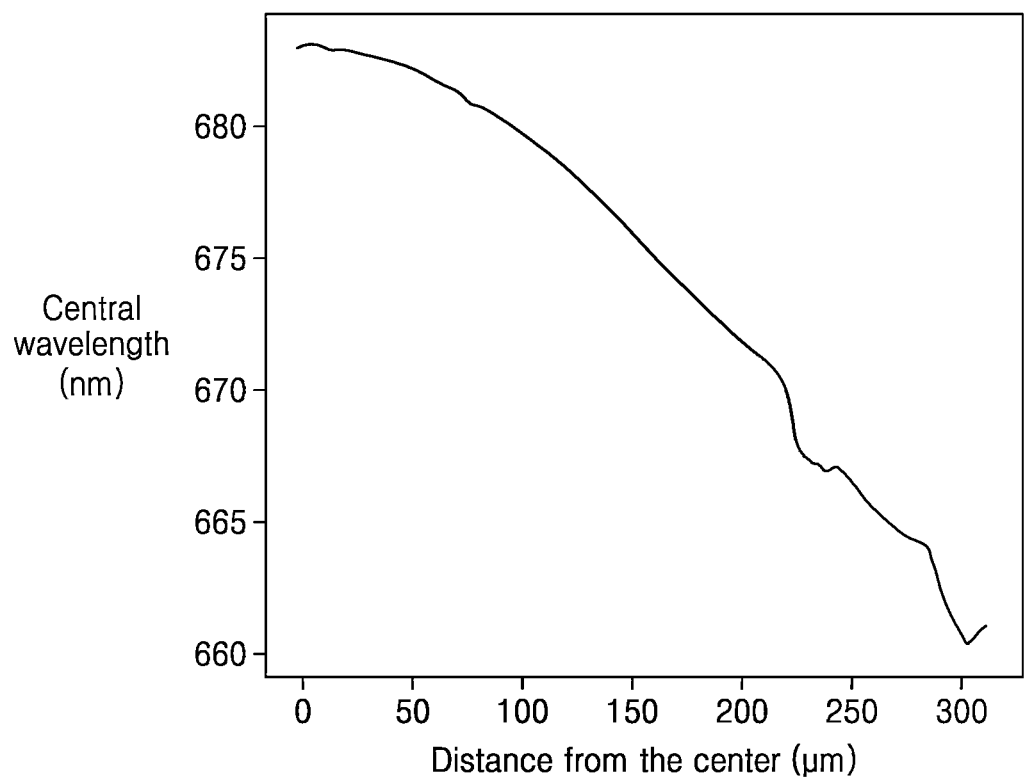
FIG. 5B is a diagram showing a change in a central wavelength when the channel is away from the center of the image sensor in the transmission spectrum of FIG. 4.

FIG. 5B is a diagram showing a change in a central wavelength when the channel is away from the center of the image sensor in the transmission spectrum of FIG. 4. Referring to FIG. 5B, as the channels are away from the center of the image sensor, the central wavelength of the channel is shifted toward a shorter side.

Figure 5C:
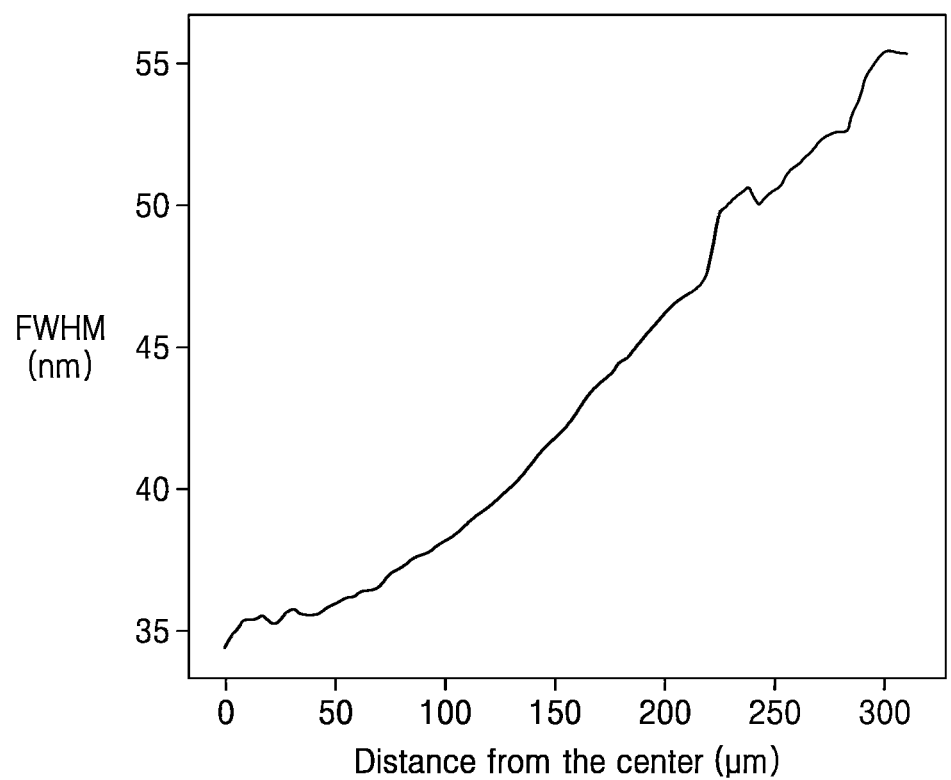
FIG. 5C is a diagram showing a change in full width at half maximum (FWHM) when the channel is away from the center of the image sensor in the transmission spectrum of FIG. 4.

FIG. 5C is a diagram showing a change in FWHM when the channel is away from the center of the image sensor in the transmission spectrum of FIG. 4. Referring to FIG. 5C, as the channels are away from the image sensor, the FWHM gradually increases.

As described above, in the image sensor including the plurality of channels having the same central wavelength, the optical characteristic of each channel is changed according to the change in the CRA of the light incident on each channel. Also, as shown in FIG. 1, in the image sensor 110 including a plurality of channels 111 having different central wavelengths from one another, the optical characteristic (e.g., the central wavelength, light intensity, FWHM, etc.) of each channel 111 may be changed when the CRA of the light incident on each channel 111 is changed.

Figure 6:
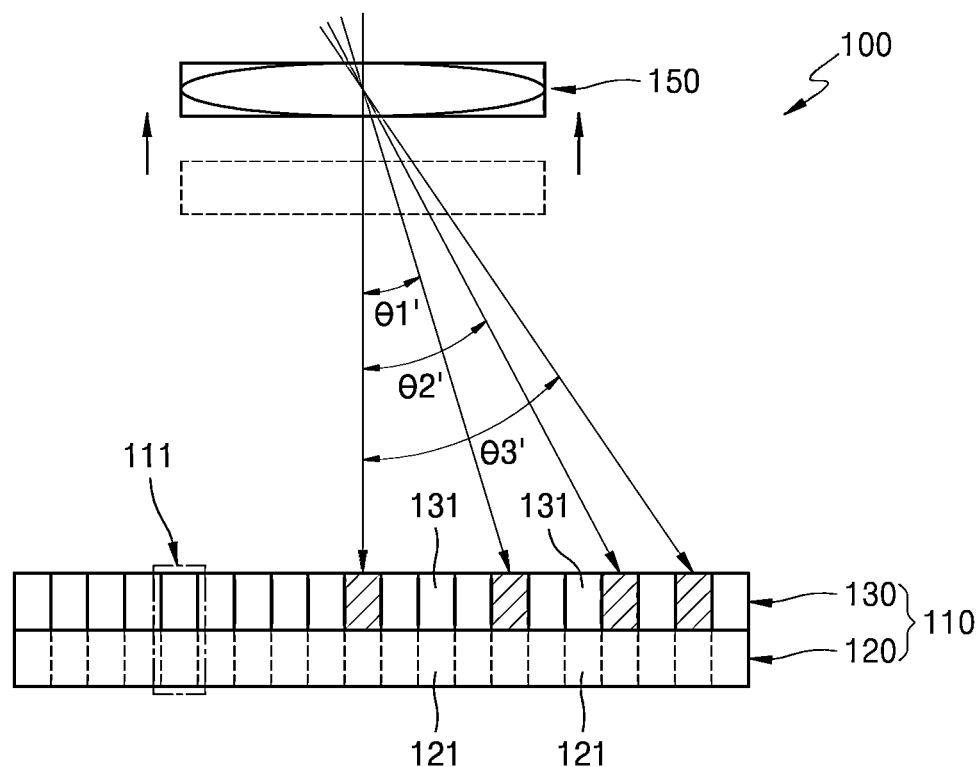
FIG. 6 is a diagram showing an optical module that is moved relative to an image sensor in the spectral camera of FIG. 1.

FIG. 6 shows an illustration in which the optical module 150 is moved upward with respect to the image sensor 110 in the spectral camera 100 of FIG. 1 according to an example embodiment.

FIG. 6 shows an example in which the optical module 150 is moved a certain distance in the upper direction in the spectral camera 100 shown in FIG. 1. The optical module 150 may be provided to move relative to the image sensor 110 so as to adjust the focus for imaging an object or to implement a zoom function. Here, the optical module 150 may be moved by a driving unit, such as an actuator.

Referring to FIG. 6, when the optical module 150 is moved, the CRA of the light incident on each channel 111 of the image sensor 110 is also changed. FIG. 6 shows an example in which the CRAs of the light incident on certain channels 111 are moved from 81 to 81', from 82 to 82', and from 83 to 83' as compared with FIG. 1, as the optical module 150 is moved relative to the image sensor 110.

As described above, the CRA of the light incident on each channel 111 of the image sensor 110 is changed as the optical module 150 is moved relative to the image sensor 110, and the optical characteristic of each channel may be also changed according to the change in the CRA.

As described above, the channels 111 arranged in the image sensor 110 may have the CRAs of the incident light changed according to distances from the center of the image sensor 110 and an interval between the image sensor 110 and the optical module 150, and the optical characteristic of each channel 111 may be changed according to the change in the CRA of the incident light. Therefore, in order to obtain accurate data about the image of the object, the change in the optical characteristic according to the change in the CRA of the each channel 111 needs to be considered.

Figure 7:
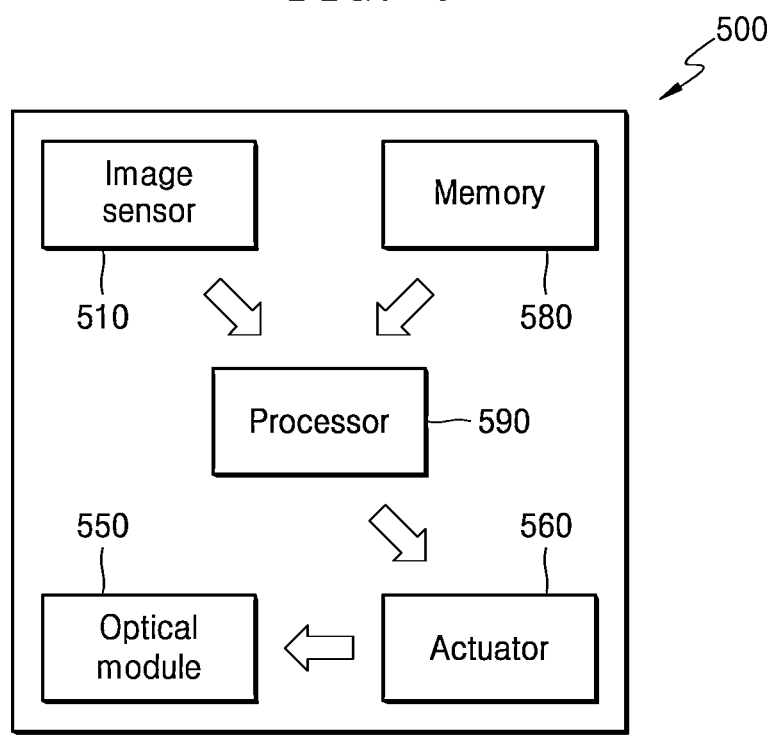
FIG. 7 is a block diagram schematically showing a spectral camera according to an example embodiment.

FIG. 7 is a block diagram schematically showing a spectral camera 500 according to an example embodiment. The spectral camera 500 of FIG. 7 may include, for example, a hyperspectral camera or a multispectral camera. However, the disclosure is not limited thereto.

Referring to FIG. 7, the spectral camera 500 may include an image sensor 510, an actuator 560, an optical module 550, a memory 580, and a processor 590. However, the disclosure is not limited to the components illustrated in FIG. 7. For example, according to various example embodiment, the spectral camera 500 may include other electronic components in additional to the components illustrated in FIG. 7 or may omit one or more components illustrated in FIG. 7.

According to an example embodiment, the image sensor 510 may analyze the light incident through the optical module 550 and output data about image information of an object that is a target to be photographed. Because the image sensor 510 is the same as the image sensor 110 of FIG. 1, detailed descriptions thereof are omitted.

The image sensor 510 may include a plurality of channels detecting different central wavelengths. For example, the image sensor 510 may include three or more channels detecting different central wavelengths from one another. The image sensor 510 may include, but is not limited to, a charge-coupled device (CCD) image sensor or a complementary metal oxide semiconductor (CMOS) image sensor.

The image sensor 510 includes a spectral filter and a pixel array provided on a lower surface of the spectral filter. The spectral filter includes a plurality of unit filters that are configured to have different central wavelengths from one another, and the pixel array may include a plurality of pixels provided to correspond to the plurality of unit filters. The spectral filter transmits light of different wavelength bands via the plurality of unit filters, and the pixel array detects the light of different wavelengths that have passed through the plurality of unit filters by using the plurality of pixels. In addition, the image sensor 510 may further include a timing controller, a row decoder, an output circuit, etc.

The optical module 550 is provided on the image sensor 510 and collects light emitted from an object to image the object on the image sensor 510. The optical module 550 may include one or more lenses. The optical module 550 may be moved relative to the image sensor 510 according to camera setting conditions such as focus adjustment or implementation of a zoom function. The spectral camera 500 may further include a driving unit for moving the optical module 550 with respect to the image sensor 510, and the actuator 560, for example, may be used as the driving unit.

The memory 580 may store information about the change in the optical characteristic of each channel of the image sensor 510. The channels arranged on the image sensor 510 may have different CRAs of incident light according to the distance from the center of the image sensor 510 and the interval between the image sensor 510 and the optical module 550. For example, the CRAs of the channels arranged on the image sensor 510 may vary based on the location of the channel with respect to the center of the image sensor (i.e., a first distance) and based on the interval between the image sensor 510 and the optical module 550 (i.e., a second distance). In addition, according to the change in the CRA of the incident light, the optical characteristic of each channel (e.g., light intensity, central wavelength, FWHM, etc.) may be changed.

With respect to each channel in the image sensor 510, information about the change in the optical characteristic according to the change in the CRA of the incident light may be obtained, and the information about the change in the optical characteristic of each channel may be stored in the memory 580. Here, data about the change in the optical characteristic of each channel may be stored in the memory 580 in the form of optical characteristic change information of a profile type expressed in a certain function through a fitting process.

The processor 590 may obtain corrected data about the image of the object by combining and analyzing the data about the image of the object output from the image sensor 510 and information about the change in the optical characteristic stored in the memory 580. Also, the processor 590 may be configured to control the actuator 560 according to the camera setting condition such as the focus adjustment or the zoom function implementation, so as to move the optical module 550 a desired distance.

Figure 8:
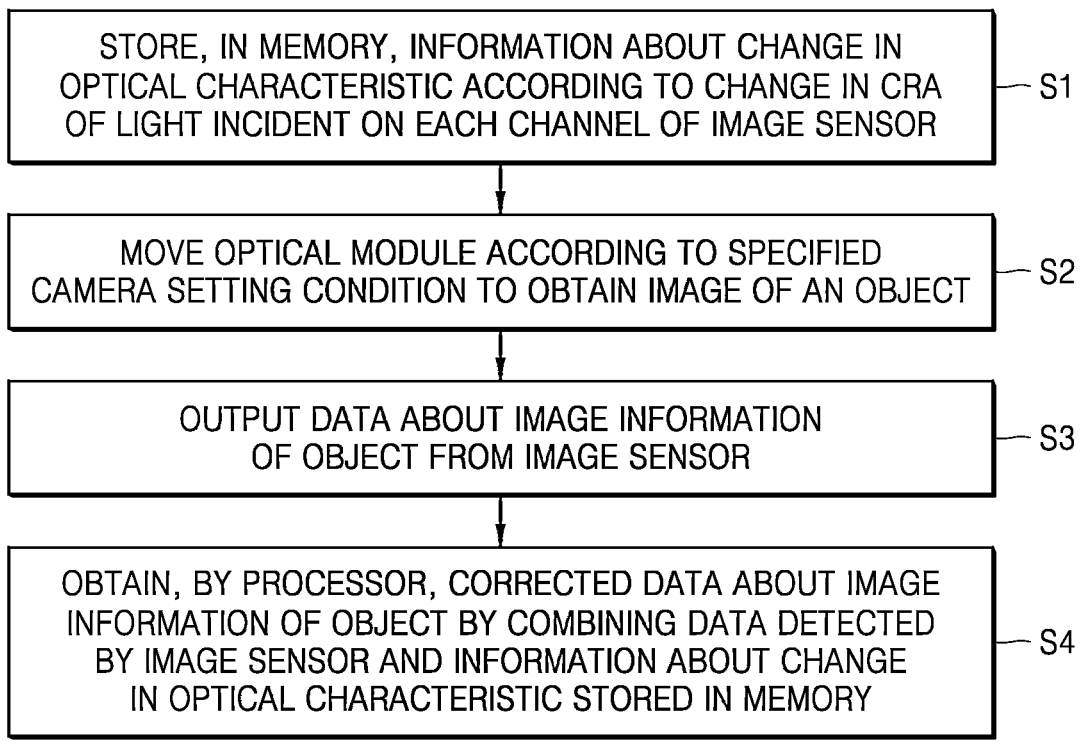
FIG. 8 is a flowchart for describing an example of a method of obtaining a spectral image by using the spectral camera of FIG. 7.

FIG. 8 is a flowchart describing a method of obtaining image information of an object by using the spectral camera 500 of FIG. 7.

According to an example embodiment, in operation S1, information about the change in the optical characteristic according to the change in the CRA of the light incident on each channel of the image sensor 510 is stored in the memory. As described above, each channel of the image sensor 510 may have the CRA that is changed according to the distance from the center of the image sensor 510 and the interval between the image sensor 510 and the optical module 550. With respect to each channel in the image sensor 510 under various camera setting conditions, information about the change in the optical characteristic according to the change in the CRA of the incident light may be obtained, and the information about the change in the optical characteristic of each channel may be stored in the memory 580. Data about the change in the optical characteristic of each channel may be stored in the memory 580 in the form of optical characteristic change information of a profile type expressed in a certain function through a fitting process.

In operation S2, the optical module 550 is moved according to a specified camera setting condition so that the object is imaged on the image sensor 510. The processor 590 may control the driving of the actuator 560 according to the specified camera setting condition, and the optical module 550 is moved according to the driving of the actuator 560 to image the object on the image sensor 510.

In operation S3, data about the image information of the object is detected from the image sensor 510. The image sensor 510 detects the light incident from the object and outputs the data about the image information of the object.

In operation S4, the processor 590 obtains corrected data about the image information of the object by combining and analyzing the data detected by the image sensor 510 and the information about the change in the optical characteristic of the channels stored in the memory 580. The processor 590 may obtain corrected data about the image information of the object by supplementing the data detected by the image sensor 510 by using the information, from among pieces of information stored in the memory 580, about the change in the optical characteristic corresponding to the specified camera setting condition. Accordingly, more accurate image information about the object may be obtained.

The processor 590 may restore input spectrum of the light input to the image sensor 510. In detail, the processor 590 may restore the input spectrum of light input to the image sensor 510 by reconstructing the corrected data obtained from each of the channels via, for example, a spectrum reconstruction algorithm, etc. Also, the processor 590 may restore the image of the object by using the input spectrum of the light incident on the image sensor 510, and accordingly, more accurate image of the object may be obtained.

The above-described spectral camera 500 may be employed in various high-performance optical devices or high-performance electronic apparatuses. The electronic apparatuses may include, for example, smartphones, mobile phones, cell phones, personal digital assistants (PDAs), laptop computers, personal computers (PCs), a variety of portable devices, electronic apparatuses, surveillance cameras, medical camera, automobiles, Internet of Things (IoT) devices, other mobile or non-mobile computing devices and are not limited thereto.

Figure 9:
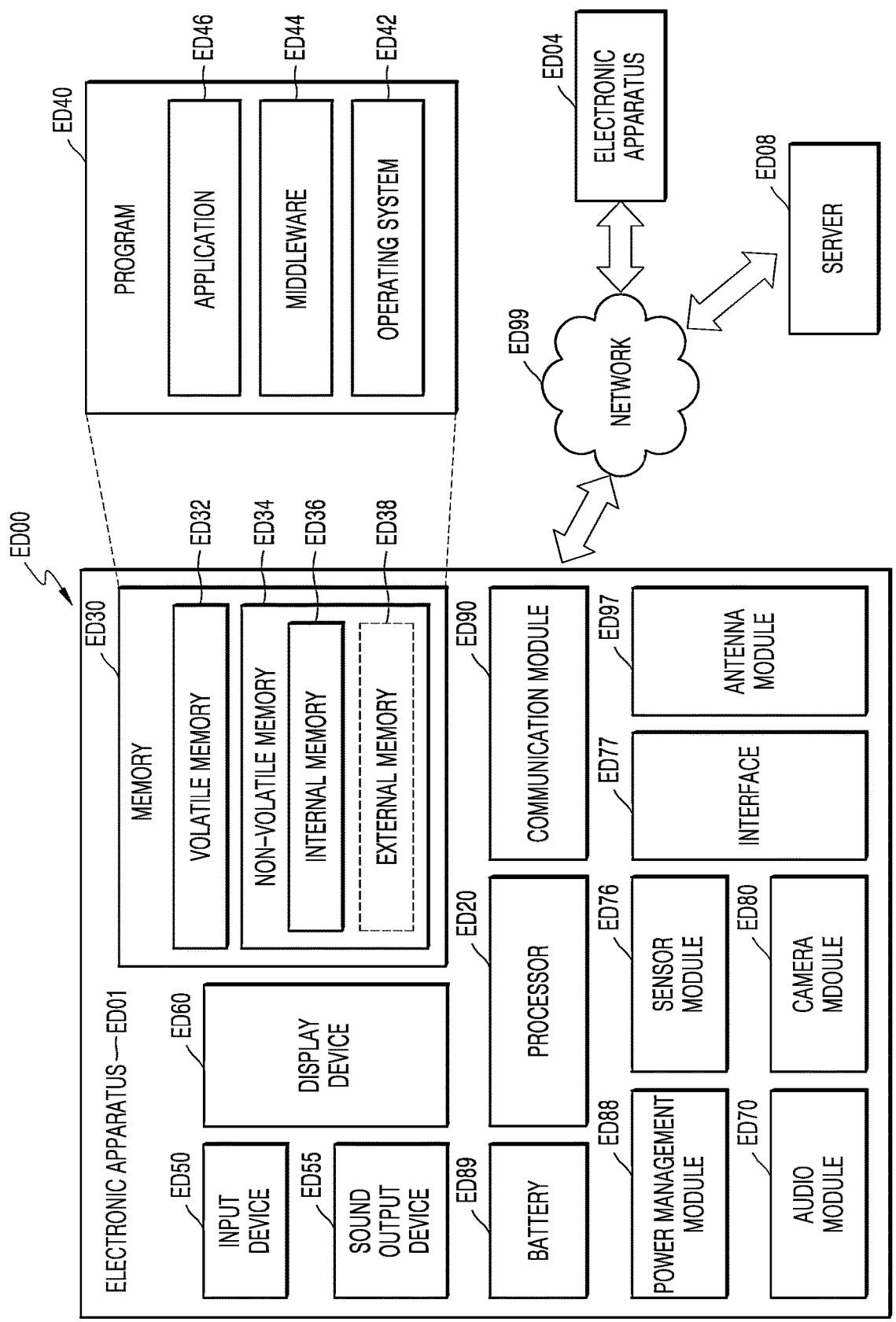
FIG. 9 is a block diagram schematically showing an electronic device according to an example embodiment.

FIG. 9 is a block diagram of an example of an electronic device ED01 according to an example embodiment. Referring to FIG. 9, the electronic device ED01 may communicate with another electronic device ED04 or a server ED08 in a network environment ED99. The electronic apparatus ED01 may include a processor ED20, a memory ED30, an input device ED50, a sound output device ED55, a display device ED60, an audio module ED70, a sensor module ED76, an interface ED77, a camera module ED80, a power management module ED88, a battery ED89, a communication module ED90, and/or an antenna module ED97. In the electronic apparatus ED01, some (display device ED60, etc.) of the elements may be omitted or another element may be added. Some of the elements may be configured as one integrated circuit. For example, the sensor module ED76 (a fingerprint sensor, an iris sensor, an illuminance sensor, etc.) may be embedded and implemented in the display device ED60 (display, etc.)

The processor ED20 may control one or more elements (hardware, software elements, etc.) of the electronic apparatus ED01 connected to the processor ED20 by executing software (program ED40, etc.), and may perform various data processes or operations. As a part of the data processing or operations, the processor ED20 may load a command and/or data received from another element (sensor module ED76, communication module ED90, etc.) to a volatile memory ED32, may process the command and/or data stored in the volatile memory ED32, and may store result data in a non-volatile memory ED34.

The memory ED30 may store various data required by the elements (processor ED20, sensor module ED76, etc.) of the electronic apparatus ED01. The data may include, for example, input data and/or output data about software (program ED40, etc.) and commands related thereto. The memory ED30 may include the volatile memory ED32 and/or the non-volatile memory ED34. The non-volatile memory ED34 may include an internal memory ED36 fixedly installed in the electronic apparatus ED01, and an external memory ED38 that is detachable.

The program ED40 may be stored as software in the memory ED30, and may include an operation system ED42, middleware ED44, and/or an application ED46. The camera module ED80 may capture a still image and a video. The camera module ED80 may include the spectral camera 500, and descriptions thereof are omitted.

Figure 10A:
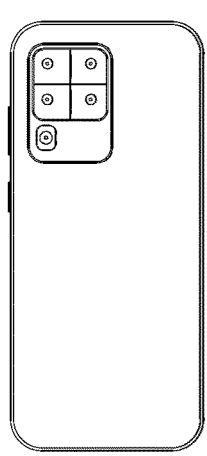
FIGS. 10A-E and 11A-11E are diagrams showing various examples of electronic device to which a spectral camera according to an example embodiment is applied.
Figure 10B:
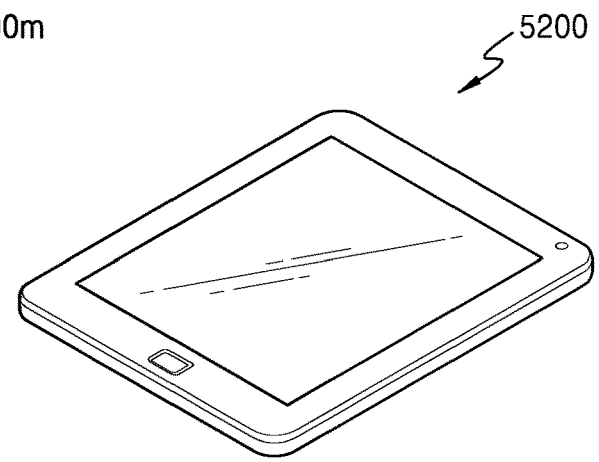
Figure 10C:
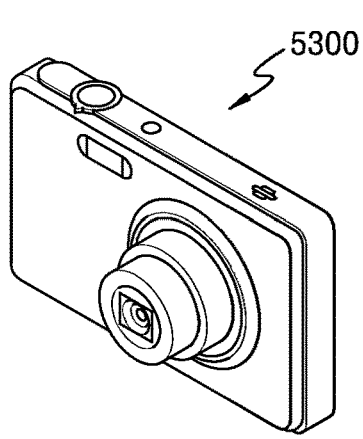
Figure 10D:
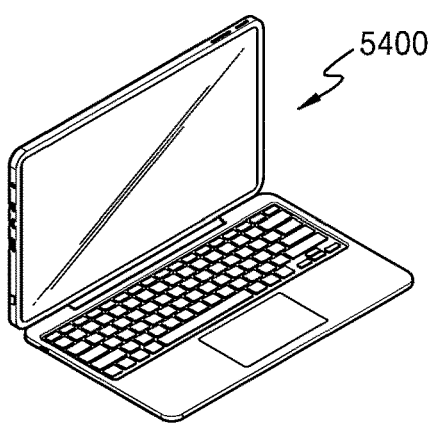
Figure 10E:
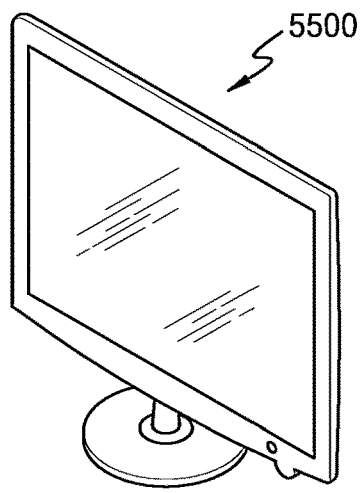

The spectral camera 500 according to the above embodiment may be applied to a mobile phone or smartphone 5100m shown in FIG. 10A, a tablet or a smart tablet 5200 shown in FIG. 10B, a digital camera or a camcorder 5300 shown in FIG. 10C, a laptop computer 5400 shown in FIG. 10D, or a television or a smart television 5500 shown in FIG. 10E. For example, the smartphone 5100m or the smart tablet 5200 may include a plurality of high-resolution cameras each including a high-resolution image sensor. Depth information of objects in an image may be extracted, out focusing of the image may be adjusted, or objects in the image may be automatically identified by using the high-resolution cameras.

Figure 11A:
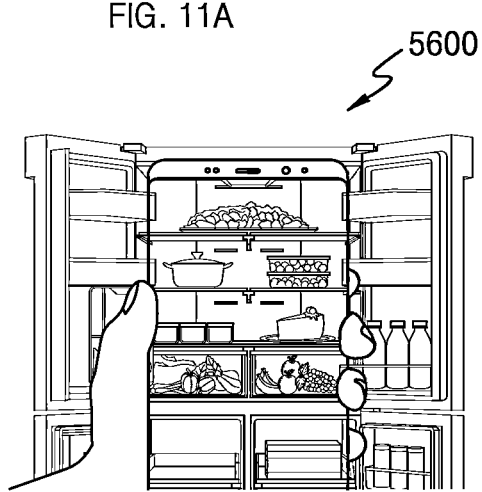
Figure 11B:
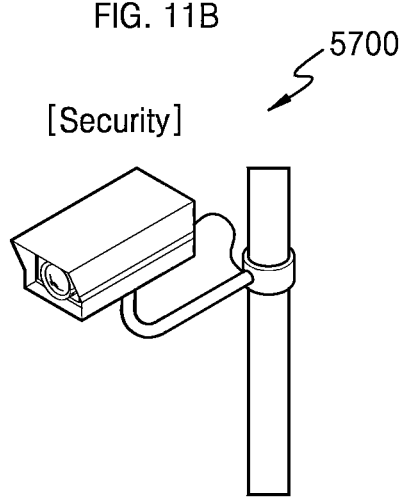
Figure 11C:
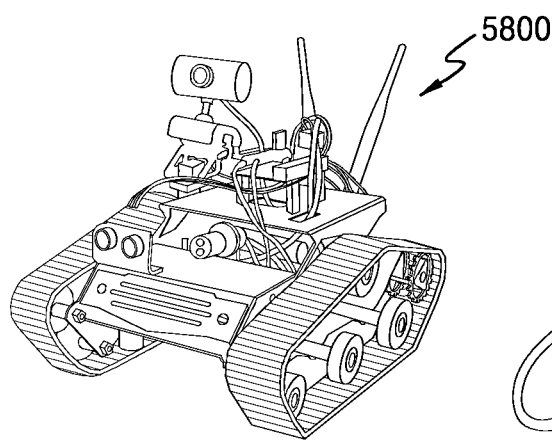
Figure 11D:
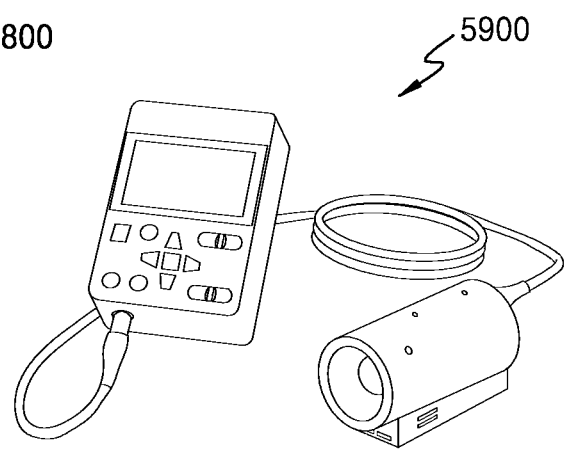

Also, the spectral camera 500 may be applied to a smart refrigerator 5600 shown in FIG. 11A, a surveillance camera 5700 shown in FIG. 11B, a robot 5800 shown in FIG. 11D, a medical camera 5900 shown in FIG. 11D, etc. For example, the smart refrigerator 5600 may automatically recognize food in the refrigerator by using the image sensor, and may notify the user of an existence of a certain kind of food, kinds of food put into or taken out, etc. through a smartphone. Also, the surveillance camera 5700 may provide an ultra-high-resolution image and may allow the user to recognize an object or a person in the image even in dark environment by using high sensitivity. The robot 5800 may be input to a disaster or industrial site that a person may not directly access, to provide the user with high-resolution images. The medical camera 5900 may provide high-resolution images for diagnosis or surgery, and may dynamically adjust a field of view.

Figure 11E:
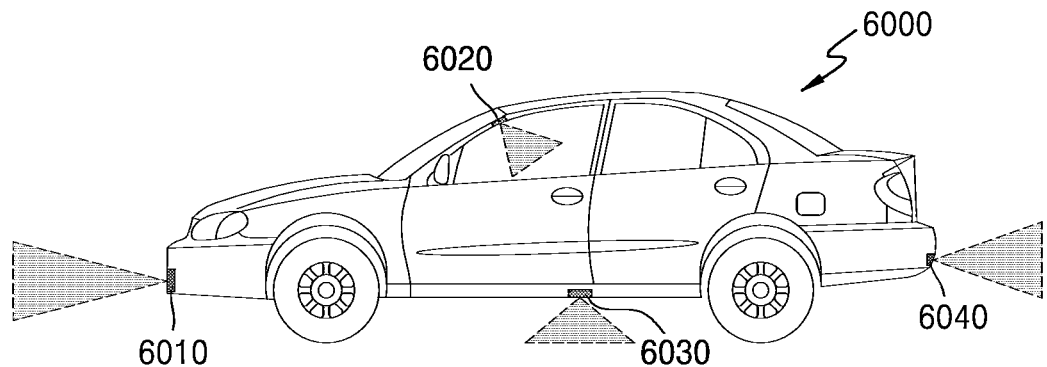

Also, the spectral camera 500 may be applied to a vehicle 6000 as shown in FIG. 11E. The vehicle 6000 may include a plurality of vehicle cameras 6010, 6020, 6030, and 6040 at various locations. Each of the vehicle cameras 6010, 6020, 6030, and 6040 may include the image sensor according to the one or more embodiments. The vehicle 6000 may provide a driver with various information about the interior of the vehicle 6000 or the periphery of the vehicle 6000 by using the plurality of vehicle cameras 6010, 6020, 6030, and 6040, and may provide the driver with the information necessary for the autonomous travel by automatically recognizing an object or a person in the image.

As described above, as the interval between the image sensor and the optical module is changed according to the camera setting condition such as the focus adjustment or the zoom function implementation, the CRA of the light incident on each channel of the image sensor is changed, and accordingly, the optical characteristic of each channel may be changed. In the spectral camera according to the embodiment, the memory stores information about the change in the optical characteristic of each channel, and the processor is configured to combine and analyze the data about the image information detected by the image sensor and the information about the change in the optical characteristic stored in the memory, and then, the corrected data about the image of the object may be obtained. Accordingly, more accurate image and color of the object may be reconstructed.

While the spectral camera and the electronic apparatus including the spectral camera have been particularly shown and described with reference to exemplary embodiments thereof, it will be understood by those of ordinary skill in the art that various changes in form and details may be made therein without departing from the spirit and scope as defined by the following claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A spectral camera comprising:
   an image sensor comprising a plurality of channels configured to detect a plurality of central wavelengths;
   an optical module configured to be movable with respect to the image sensor to provide an image of an object on the image sensor;
   a memory configured to store first information about a change in an optical characteristic of each of the plurality of channels in the image sensor, the change in the optical characteristic of each of the plurality of channels corresponding to a movement of the optical module; and
   a processor configured to:
     obtain the first information from the memory,
     obtain second information corresponding to the plurality of central wavelengths detected by the image sensor, and
     obtain third information by correcting the second information based on the first information.

2. The spectral camera of claim 1, wherein the change in the optical characteristic of each of the plurality of channels in the image sensor is generated based on a change of a chief ray angle (CRA) of light incident on each channel of the image sensor.

3. The spectral camera of claim 1, further comprising a driver configured to move the optical module with respect to the image sensor.

4. The spectral camera of claim 3, wherein the processor is further configured to control the driver.

5. The spectral camera of claim 1, wherein the plurality of channels comprises at least three channels detecting central wavelengths different from one another.

6. The spectral camera of claim 1, further comprising a hyperspectral camera or a multispectral camera.

7. The spectral camera of claim 1, wherein the image sensor further comprises:
   a spectral filter comprising a plurality of unit filters having different central wavelengths; and
   a pixel array comprising a plurality of pixels on which light that has passed through the plurality of unit filters is incident.

8. The spectral camera of claim 1, wherein the memory is further configured to store the first information in a form of a profile obtained through a fitting process for data about the change in the optical characteristic of each of the plurality of channels in the image sensor.

9. The spectral camera of claim 1, wherein the processor is further configured to restore an input spectrum of light incident on the image sensor through reconstruction of the third information.

10. The spectral camera of claim 9, wherein the processor is further configured to restore the image of the object by using the input spectrum.

11. An electronic apparatus comprising the spectral camera of claim 1.

12. The spectral camera of claim 1, wherein the first information is a profile of the optical characteristic of each channel with respect to a change in focus of light incident on each channel of the image sensor.

13. The spectral camera of claim 1, wherein the first information indicates a relationship between the optical characteristic of each channel and a chief ray angle (CRA) of light incident on each channel of the image sensor.

14. An operating method of a spectral camera, the operating method comprising:
   imaging an object onto an image sensor of the spectral camera by moving an optical module of spectral camera, the image sensor comprising a plurality of channels configured to detect a plurality of central wavelengths;
   obtaining, from a memory of the spectral camera, first information about a change in an optical characteristic of at least one the plurality of channels in the image sensor, the change in the optical characteristic of the at least one of the plurality of channels corresponding to a movement of the optical module;
   obtaining second information corresponding to the plurality of central wavelengths detected by the image sensor; and
   obtaining third information by correcting the second information based on the first information.

15. The method of claim 14, further comprising moving the optical module by a driver of the spectral camera controlled by a processor of the spectral camera.

16. The method of claim 14, wherein the plurality of channels comprises at least three channels detecting different central wavelengths.

17. The method of claim 14, further comprising storing the first information in a form of a profile obtained through a fitting process for data about the change in the optical characteristic of each of the plurality of channels in the image sensor.

18. The method of claim 14, further comprising restoring an input spectrum of light incident on the image sensor through reconstruction of the third information.

19. The method of claim 18, further comprising restoring the image of the object by using the input spectrum.

20. An electronic apparatus comprising:
   a memory storing one or more instructions; and
   a processor configured to execute the one or more instructions to:
     control an image sensor to detect a plurality of central wavelengths, the image sensor comprising a plurality of channels,
     control an optical module to move with respect to the image sensor to provide an image of an object on the image sensor,
     obtain first information about a change in an optical characteristic of at least one the plurality of channels in the image sensor, the change in the optical characteristic of the at least one of the plurality of channels corresponding to a movement of the optical module,
     obtain second information corresponding to the plurality of central wavelengths detected by the image sensor, and
     obtain third information by correcting the second information based on the first information.

* * * * *